United States Patent
Wang

(10) Patent No.: US 12,193,076 B2
(45) Date of Patent: Jan. 7, 2025

(54) COT SHARING INDICATOR FOR MESSAGE 3 IN RANDOM ACCESS PROCEDURE

(71) Applicant: Telefonaktiebolaget LM Ericsson (publ), Stockholm (SE)

(72) Inventor: Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 615 days.

(21) Appl. No.: 17/599,205

(22) PCT Filed: Mar. 24, 2020

(86) PCT No.: PCT/EP2020/058095
§ 371 (c)(1),
(2) Date: Sep. 28, 2021

(87) PCT Pub. No.: WO2020/193515
PCT Pub. Date: Oct. 1, 2020

(65) Prior Publication Data
US 2022/0256595 A1    Aug. 11, 2022

(51) Int. Cl.
*H04W 72/14* (2009.01)
*H04W 72/0453* (2023.01)
(Continued)

(52) U.S. Cl.
CPC ..... *H04W 74/085* (2013.01); *H04W 72/0453* (2013.01); *H04W 72/23* (2023.01); *H04W 74/002* (2013.01); *H04W 74/0866* (2013.01)

(58) Field of Classification Search
None
See application file for complete search history.

(56) References Cited

U.S. PATENT DOCUMENTS

2017/0303303 A1    10/2017  Yang et al.
2020/0229157 A1*    7/2020  Rastegardoost ...... H04L 5/0098
(Continued)

FOREIGN PATENT DOCUMENTS

CN    109075914 A    12/2018
KR    20170093071 A    8/2017

OTHER PUBLICATIONS

International Search Report and Written Opinion of the International Searching Authority, PCT/EP2020/058095, mailed Jun. 8, 2020, 13 pages.
(Continued)

*Primary Examiner* — Anez C Ebrahim
(74) *Attorney, Agent, or Firm* — Sage Patent Group

(57) ABSTRACT

A method of operating a user equipment, UE, in a wireless communication system includes receiving a first random access procedure message from a base station, the first random access procedure message containing a channel occupancy time, COT, sharing indicator that indicates a shared COT period associated with the first random access procedure message, and transmitting a second random access procedure message to the base station within the shared COT period. A method of operating a base station includes transmitting a first random access procedure message to a user equipment, UE, the first random access procedure message containing a channel occupancy time, COT, sharing indicator that indicates a shared COT period associated with the first random access procedure message, and receiving a second random access procedure message from the UE within the shared COT period.

14 Claims, 9 Drawing Sheets

(51) Int. Cl.
*H04W 72/23* (2023.01)
*H04W 74/00* (2009.01)
*H04W 74/08* (2009.01)
*H04W 74/0833* (2024.01)

(56) References Cited

U.S. PATENT DOCUMENTS

2022/0104259 A1* 3/2022 Li .................. H04W 74/0816
2022/0167407 A1* 5/2022 Oviedo ............ H04W 74/0808

OTHER PUBLICATIONS

Nokia et al., 3GPP TSG RAN WG1, Meeting #96, R1-1903705, Feature Lead's Summary #2 on Channel Access Procedures, Athens, Greece, Feb. 25-Mar. 1, 2019, 23 pages.
Lenovo et al., 3GPP TSG RAN WG1 #96, R1-1902962, Extensions for Channel Access Procedures, Athens, Greece, Feb. 25-Mar. 1, 2019, 3 pages.
Samsung, 3GPP TSG-RAN WG1 Ad-hoc Meeting 1901, R1-1901031, Channel access procedures for NR-U, Taipei, Taiwan, Jan. 21-25, 2019, 10 pages.
Intel Corporation, 3GPP TSG RAN WG1 Meeting #99, R1-1912198, Enhancements to initial access and mobility for NR-unlicensed, Reno, Nevada, United States, Nov. 18-22, 2019, 8 pages.
$3^{rd}$ Generation Partnership Project, 3GPP TR 38.889 v16.0.0 (Dec. 2018), Technical Specification Group Radio Access Network; Study on NR-based access to unlicensed spectrum (Release 16), 119 pages.
$3^{rd}$ Generation Partnership Project, 3GPP TR 38.321 v15.4.0 (Dec. 2018), Technical Specification Group Radio Access Network; NR; Medium Access Control (MAC) protocol specification (Release 15), 77 pages.
$3^{rd}$ Generation Partnership Project, 3GPP TR 38.213 v15.4.0 (Dec. 2018), Technical Specification Group Radio Access Network; NR; Physical layer procedures for control (Release 15), 104 pages.
$3^{rd}$ Generation Partnership Project, 3GPP TR 38.213 v15.5.0 (Mar. 2019), Technical Specification Group Radio Access Network; NR; Physical layer procedures for control (Release 15), 104 pages.
First Chinese Office Action for Chinese Application No. CN 202080023580.X mailed Nov. 25, 2023, 17 pages (including English translation).
Nokia et al., 3GPP TSG RAN WG2, Meeting #104, R2-1817195, "Network Control of 2-Step CBRA Procedure", Spokane, USA, Nov. 12-16, 2018, 6 pages.
Samsung, 3GPP TSG RAN WG1, Meeting #94, R1-1808768, "Channel Access Procedures for NR-U", Gothenburg, Sweden, Aug. 20-24, 2018, 6 pages.
Huwei et al., 3GPP TSG RAN WG1, Meeting #95, R1-1812195, "Initial Access in NR Unlicensed", Spokane, USA, Nov. 12-16, 2018, 10 pages.
Mediatek Inc., 3GPP TSG RAN WG1, Meeting #95, R1-1812356, "Channel Access Procedure in NR-U", Spokane, USA, Nov. 12-16, 2018, 4 pages.

* cited by examiner

COT SHARING INDICATOR FOR MESSAGE 3 IN RANDOM ACCESS PROCEDURE

CROSS REFERENCE TO RELATED APPLICATIONS

This application is a 35 U.S.C. § 371 national stage application of PCT International Application No. PCT/EP2020/058095 filed on Mar. 24, 2020, which in turns claims domestic priority to U.S. Provisional Patent Application No. 62/825,748, filed on Mar. 28, 2019, the disclosures and content of which are incorporated by reference herein in their entirety.

TECHNICAL FIELD

The present disclosure relates to wireless communication systems and, more particularly, to random access procedures for wireless communication systems.

BACKGROUND

Next generation wireless communication systems are expected to support a wide range of use cases with varying requirements ranging from fully mobile devices to stationary IoT or fixed wireless broadband devices. The traffic pattern associated with many use cases is expected to consist of short or long bursts of data traffic with varying length of waiting period between bursts (here called inactive state). In the New Radio (NR) specification, both license assisted access and standalone unlicensed operation are to be supported in 3GPP. Thus, the procedure of physical random access channel (PRACH) transmission and/or scheduling request (SR) transmission in unlicensed spectrum is under investigation for NR.

NR-U Introduction

In order to tackle the ever-increasing demand for data, NR is considering the use of both licensed and unlicensed spectrum. 3GPP has defined a study item on NR-based Access to Unlicensed Spectrum (NR-U). Compared to License Assisted Access (LAA) in LTE, NR-U also needs to support Dual Connectivity (DC) and standalone scenarios, where the MAC procedures including random access channel (RACH) and scheduling procedures on unlicensed spectrum are subject to listen-before-talk (LBT) failures. There was no such restriction in LTE LAA, since there was licensed spectrum in LAA scenario so the RACH and scheduling related signaling can be transmitted on the licensed spectrum instead of unlicensed spectrum.

For discovery reference signal (DRS) transmission such as PSS/SSS, PBCH, CSI-RS, control channel transmission such as PUCCH/PDCCH, physical data channel such as PUSCH/PDSCH, and uplink sounding reference signal such as SRS transmission, channel sensing should be applied to determine the channel availability before the physical signal is transmitted using the channel.

The radio resource management (RRM) procedures in NR-U would be generally similar to those in LAA, since NR-U is aiming to reuse LAA/eLAA/feLAA technologies as much as possible to handle the coexistence between NR-U and other legacy radio access technologies (RATs).

Hence, channel access/selection for LAA was one of important aspects for co-existence with other RATs such as Wi-Fi. For instance, LAA has aimed to use carriers that are congested with Wi-Fi.

In the licensed spectrum, a UE measures Reference Signal Received Power (RSRP), and Reference Signal Received Quality (RSRQ) of the downlink radio channel (e.g. SSB, CSI-RS), and provides the measurement reports to its serving eNB/gNB. However, these measurements do not reflect the interference strength on the carrier. Another metric, Received Signal Strength Indicator (RSSI), can serve for such purpose. At the eNB/gNB side, it is possible to derive RSSI based on the received RSRP and RSRQ reports. However, this requires the RSRP And RSRQ reports to be available. Due to LBT failure, some RSRP or RSRP reports may be blocked, either due to the discovery reference signal (DRS) transmission being blocked in the downlink or the measurement report being blocked in the uplink. The RSSI measurements, together with the time information concerning when and how long time that UEs have made the measurements, can assist the gNB/eNB to detect hidden nodes. Additionally, the gNB/eNB can measure the load situation of the carrier, which is useful for the network to prioritize some channels for load balance and channel access failure avoidance purposes.

LTE LAA has been defined to support measurements of averaged RSSI and channel occupancy for measurement reports. The channel occupancy is defined as percentage of time that RSSI was measured above a configured threshold. For this purpose, a RSSI measurement timing configuration (RMTC) includes a measurement duration (e.g. 1-5 ms) and a period between measurements (e.g. {40, 80, 160, 320, 640} ms).

COT Sharing in NR-U

For a node (e.g., an NR-U gNB/UE, an LTE-LAA eNB/UE, or a Wi-Fi AP/STA) to be allowed to transmit in unlicensed spectrum (e.g., 5 GHz band), it typically needs to perform a clear channel assessment (CCA). This procedure typically includes sensing the medium to be idle for a number of time intervals. Sensing the medium to be idle can be done in different ways, such as using energy detection, preamble detection or using virtual carrier sensing. The latter implies that the node reads control information from other transmitting nodes indicating when a transmission ends. After sensing the medium to be idle, the node is typically allowed to transmit for a certain amount of time, sometimes referred to as transmission opportunity (TXOP). The length of the TXOP depends on regulation and type of CCA that has been performed, but typically ranges from 1 ms to 10 ms. This duration is often referred to as a Channel Occupancy Time (COT).

In Wi-Fi, feedback of data reception acknowledgements (ACKs) is transmitted without performing a clear channel assessment. Preceding feedback transmission, a small time duration (the Short Interframe Spacing, or SIFS) is introduced between the data transmission and the corresponding feedback which does not include actual sensing of the channel. In 802.11, the SIFS period (16 μs for 5 GHz OFDM PHYs) is defined as:

$$aSIFSTime=aRxPHYDelay+aMACProcessingDelay+aRxTxTurnaroundTime$$

where aRxPHYDelay defines the duration needed by the PHY layer to deliver a packet to the MAC layer, aMACProcessingDelay defines the duration that the MAC layer needs to trigger the PHY layer transmitting a response, and aRxTxTurnaroundTime defines the duration needed to turn the radio from reception into transmit mode.

The SIFS duration is used to accommodate the hardware delay needed to switch the direction from reception to transmission.

It is anticipated that for NR in unlicensed bands (NR-U), a similar gap to accommodate for the radio turnaround time will be allowed. For example, this will enable the transmission of PUCCH carrying uplink control information (UCI) feedback as well as PUSCH carrying data and possible UCI within the same transmit opportunity (TXOP) acquired by the initiating gNB without the UE performing clear channel assessment before PUSCH/PUCCH transmission, as long as the gap between DL and UL transmission is less than or equal to 16 μs. Operation in this manner is typically called "COT sharing." An example of COT sharing is illustrated in FIG. 1. In particular, FIG. 1 illustrates transmission opportunities (TXOP) both with and without COT sharing where CCA is performed by the initiating node (gNB). For the case of COT sharing the gap between DL and UL transmission is less than 16 μs.

When a UE accesses a medium via Cat-4 LBT with a configured grant outside of a gNB COT, it is also possible for UE and gNB to share the UE acquired COT to schedule downlink (DL) data to the same UE. UE COT information can be indicated in UCI, such as CG-UCI for configured grant PUSCH resources.

FIG. 2 illustrates an example of UE COT sharing with the DL transmission. For the case of COT sharing, the gap between UL and DL transmission is less than 16 μs.

Channel Access Procedure in NR-U

Listen-before-talk (LBT) is designed for unlicensed spectrum co-existence with other radio access technologies (RATs). In this mechanism, a radio device applies a clear channel assessment (CCA) check (i.e. channel sensing) before any transmission. The transmitter performs energy detection (ED) over a time period compared to a certain energy detection threshold in order to determine if a channel is idle. If the channel is determined to be occupied, the transmitter performs a random back-off within a contention window before next CCA attempt. To protect the ACK transmissions, the transmitter must defer a period after each busy CCA slot prior to resuming back-off. As soon as the transmitter has grasped access to a channel, the transmitter is only allowed to perform transmission up to a maximum time duration (namely, the maximum channel occupancy time, MCOT). For QoS differentiation, a channel access priority based on the service type has been defined. For example, there are four LBT priority classes are defined for differentiation of channel access priorities between services using contention window size (CWS) and MCOT duration.

As described in 3GPP TR 38.889 [1], the channel access schemes for NR-based access for unlicensed spectrum can be classified into the following categories:

Category 1: Immediate transmission after a short switching gap. This is used for a transmitter to immediately transmit after a UL/DL switching gap inside a COT. The switching gap from reception to transmission is to accommodate the transceiver turnaround time and is no longer than 16 μs.

Category 2: LBT without random back-off. The duration of time that the channel is sensed to be idle before the transmitting entity transmits is deterministic.

Category 3: LBT with random back-off with a contention window of fixed size. The LBT procedure has the following procedure as one of its components: the transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.

Category 4: LBT with random back-off with a contention window of variable size. The LBT procedure has the following as one of its components: The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

For different transmissions in a COT and different channels/signals to be transmitted, different categories of channel access schemes can be used.

RACH Procedures in NR Unlicensed Spectrum

The ordinary four step random access (RA) procedure has been the current standard for legacy systems such as LTE and NR Rel-15. It has been proposed to study a two-step procedure where the UL messages (PRACH+Msg3) are sent simultaneously, and similarly the two downlink (DL) messages, such as the time advance command in random access response (RAR) and contention resolution information, are sent as a simultaneous response in the DL. In the legacy four step procedure, one of the main uses of the first two messages is to obtain UL time alignment for the UE. In many situations, e.g. in small cells or for stationary UEs, this may not be needed, since either a TA=0 will be sufficient (small cells) or a stored TA value from the last random access (RA) procedure could serve also for the current RA (stationary UE). In future radio networks it can be expected that these situations are common, both due to dense deployments of small cells and a great number of e.g. stationary IoT devices. A possibility to skip the message exchange to obtain the TA value would lead to reduced RA latency and would be beneficial in several use cases, for example when transmitting infrequent small data packets. On the other hand, the two step RA will consume more resources, since it uses contention-based transmission of the data. This means that the resources that are configured for the data may often be unused.

If both the four-step and two-step RA are configured in a cell (and for the UE), the UE will choose a preamble from one specific set if it wants to do a four-step RA, and from another set if it wants to do a two-step RA. Hence a preamble partition is done to distinguish between four-step and two-step RA.

Legacy Four Step Random Access

The legacy four step RA has been used in LTE and is also proposed as baseline for NR. The principle of this procedure is shown in FIG. 3. The UE randomly selects a preamble which is transmitted.

When the eNB detects the preamble, it estimates the timing alignment (TA) the UE should use in order to obtain UL synchronization at the eNB. The eNB responds with the TA in a grant for Msg3. In Msg3, the UE transmits its identifier, and the eNB responds by acknowledging the UE ID in Msg 4. The Msg 4 gives contention resolution, i.e. only one UE's identifier will be sent even if several UEs have used the same preamble (and Msg 3) simultaneously. In LTE, four step RA cannot be completed in less than 14 ms/TTI/SF.

Two Step Random Access

The two step RA procedure gives much shorter latency than the ordinary four step RA. In the two step RA, the preamble and a message corresponding to Message 3 (Msg3) in the four step RA are transmitted in the same subframe or in two subsequent subframes. The Msg3 is sent on a resource dedicated to the specific preamble. This means that both the preamble and the Msg3 face contention, but contention resolution in this case means that either both preamble and Msg3 are sent without collision or both collide. The 2-step procedure is depicted in FIG. 4.

Upon successful reception of the preamble and Msg 3, the eNB will respond with a TA (which by assumption should not be needed or just give very minor updates) and a Msg 4 for contention resolution.

An issue that may occur if the UE timing alignment is bad (e.g. using TA=0 in a large cell or using an old TA even though the UE has moved) is that only the preamble can be detected by the eNB. A transmission with an inaccurate TA value may interfere transmissions from other UEs in the same cell. Additionally, the preamble signal has higher detection probability than the normal data due to its design pattern. In this case the network may reply with an ordinary RAR, giving the UE an opportunity to transmit an ordinary Msg3 on a scheduled resource. This is a fallback to four step RA.

Random Access Response (RAR)

A gNB that momentarily detects more than one random access preamble may select to separate its responses in more than one MAC protocol data unit (PDU), or it may select to concatenate its responses into one and same MAC PDUs. FIG. 5 illustrates such a concatenated MAC PDU.

If the gNB cannot handle all detected preambles, it may send a backoff indicator (BI) to certain preambles, as illustrated as subPDU#1 in leftmost part of FIG. 5. If the gNB detects a preamble that is used to request system information (SI), it may just acknowledge reception, as illustrated as subPDU#2 in FIG. 5.

The gNB may select to acknowledge with a RAR, which is where the Msg3 occurs. The subheader corresponding to a RAR consists of three header fields E/T/RAPID as illustrated in FIG. 6.

Apart from the field of reserved R bits, the payload corresponding to a RAR consists of three fields, as illustrated in FIG. 7, which illustrates a format for Timing Advance Command, UL Grant and Temporary C-RNTI. The fields R and UL Grant are specified as follows. R: Reserved bit, set to "0"; UL Grant: The Uplink Grant field indicates the resources to be used on the uplink. The size of the UL Grant field is 27 bits.

UL Grant in RAR

The UL grant in RAR schedules a PUSCH transmission from the UE (Msg3 PUSCH). The contents of the RAR UL grant, starting with the MSB and ending with the LSB, are given in Table 1 below.

TABLE 1

(3GPP TS 38.213/Table 8.2-1: Random Access Response Grant Content field size

| RAR grant field | Number of bits |
| --- | --- |
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |

SUMMARY

Some embodiments provide a method of operating a user equipment, UE, in a wireless communication system. The method includes receiving a first random access procedure message from a base station, the first random access procedure message containing a channel occupancy time, COT, sharing indicator that indicates a shared COT period associated with the first random access procedure message, and transmitting a second random access procedure message to the base station within the shared COT period.

Some embodiments provide a method of operating a base station. The method includes transmitting a first random access procedure message to a user equipment, UE, the first random access procedure message containing a channel occupancy time, COT, sharing indicator that indicates a shared COT period associated with the first random access procedure message, and receiving a second random access procedure message from the UE within the shared COT period.

Some further embodiments provide a method of operating a user equipment, UE, in a wireless communication system. The method includes receiving a first random access procedure message from a base station, the first random access procedure message containing a channel access type field that indicates a channel access type that can be used for transmitting the second random access procedure message during a shared channel occupancy time, COT, period associated with the first random access procedure message, and transmitting a second random access procedure message to the base station within the shared COT period.

Some further embodiments provide a method of operating a base station. The method includes transmitting a first random access procedure message to a user equipment, UE, the first random access procedure message containing a channel access type field that indicates a channel access type that can be used for transmitting a second random access procedure message during a shared channel occupancy time, COT, period associated with the first random access procedure message, and receiving the second random access procedure message from the UE within the shared COT period.

BRIEF DESCRIPTION OF THE DESCRIPTION OF THE DRAWINGS

Figure 12:
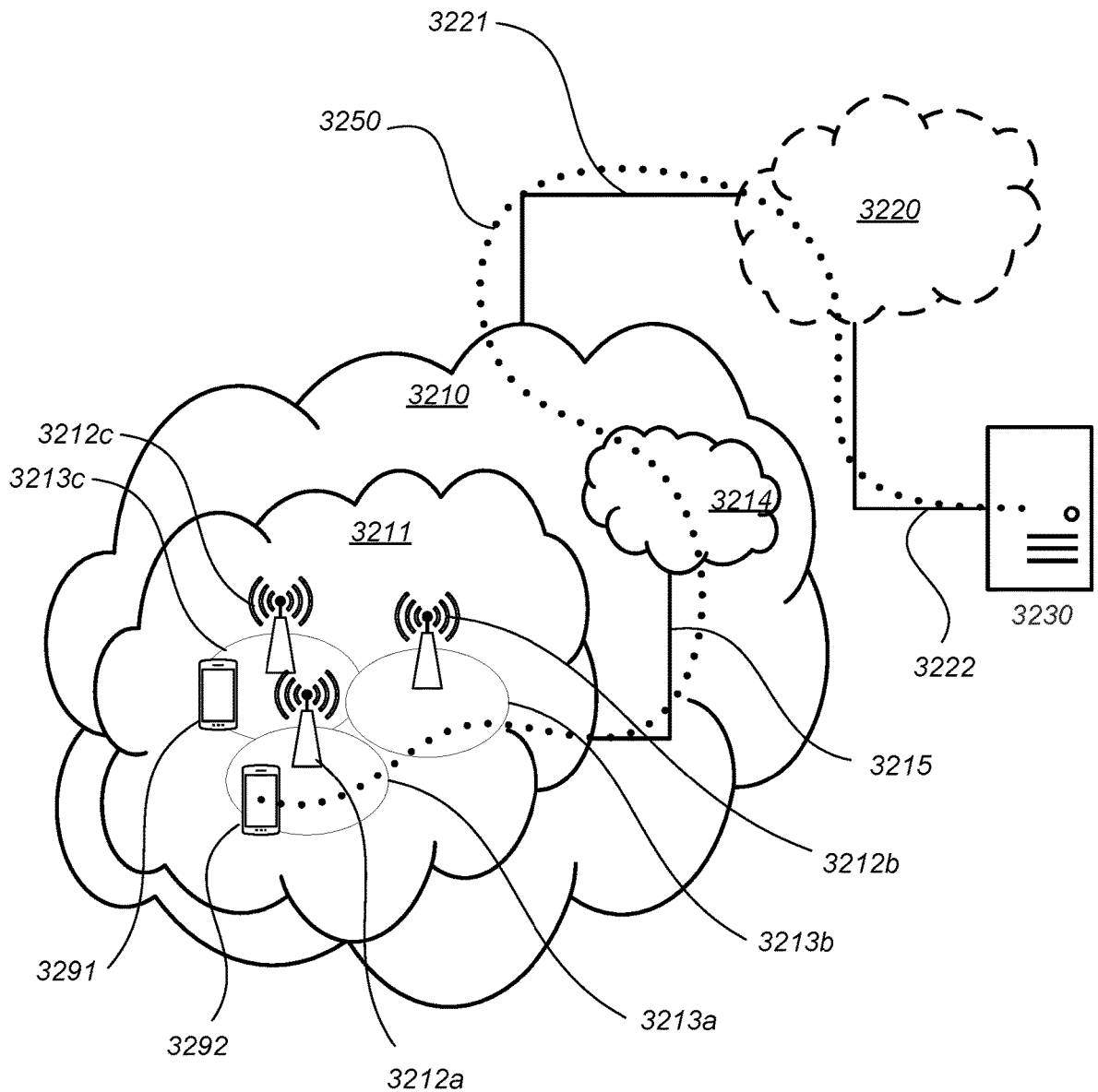

FIG. 12 schematically illustrates a telecommunication network connected via an intermediate network to a host computer.

Figure 13:
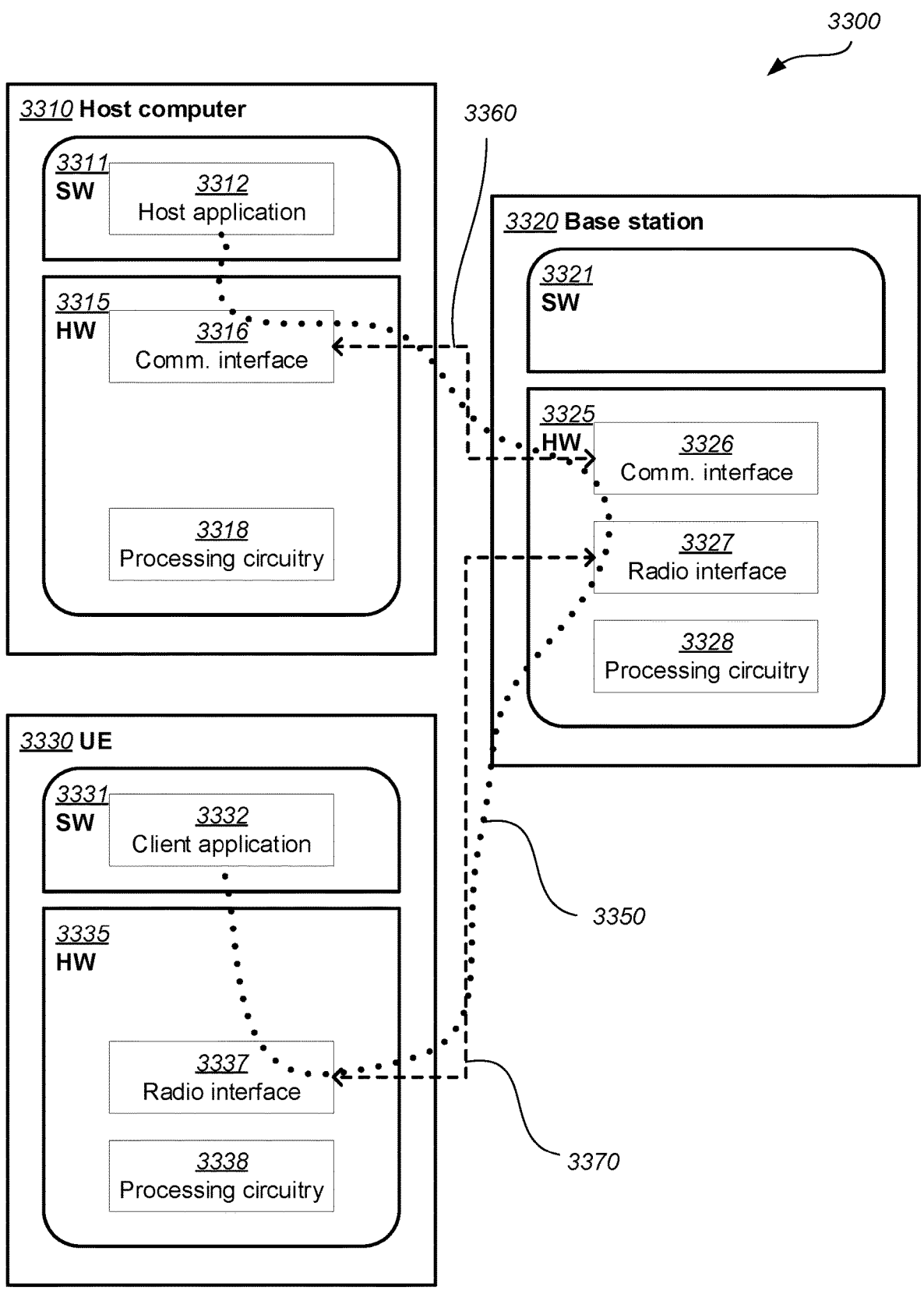

FIG. 13 is a generalized block diagram of a host computer communicating via a base station with a user equipment over a partially wireless connection.

FIGS. 14 to 17 are flowcharts illustrating methods implemented in a communication system including a host computer, a base station and a user equipment.

DETAILED DESCRIPTION

In the RAN2#105, there are several alternatives concerning how to provide additional opportunities for transmitting Msg3.

In one alternative, Msg3 is repeated in time domain. In this alternative, a UE can transmit a Msg3 with the same grant repetitively in time domain on multiple occasions. In this alternative, an indicator indicating Msg3 repetitions is carried in the RAR.

In another alternative, Multiple grants are carried in the RAR. In this alternative, a UE receives multiple grants from one RAR message. The UE performs LBT for each grant and uses the grant which has passed the LBT for transmission of the Msg3.

In another alternative, multiple RARs can be received within the same RAR window. In this alternative, a UE is allowed to receive multiple RAR messages within the same RAR window. Each RAR can carry a different grant.

In addition, RAN1 has made agreements concerning the channel access mechanism for a RA procedure. In particular, it was agreed that LBT other than Cat4 is not considered for UL transmissions that are part of a RACH procedure that initiate a channel occupancy. This does not preclude the use of Cat 2 for transmission on a LBT bandwidth if it is allowed for the case of transmission on multiple LBT bandwidths.

From this agreement, it is interpreted that RA messages of an RA procedure would apply a Cat4 LBT in case the corresponding transmission is not performed within a shared COT initiated by a gNB.

RAN1 has also discussed COT sharing for NR-U. The intention is to avoid unnecessary LBT operations for subsequent transmission burst within a COT period, which may be initiated by a gNB. The below agreements concerning a shared DL COT with UL bursts have been captured in the TR.

Within a gNB-initiated COT, a UL burst for a UE consisting of one or more of PUSCH, PUCCH, PRACH, and SRS follows the channel access schemes in Table 2 below, which is reproduced from 3GPP TR 38.889 Table 7.2.1.3.1-3.

TABLE 2

(3GPP TR 38.889/Table 7.2.1.3.1-3): Channel access schemes for a UL burst within a gNB-initiated COT as LBE device

| Cat 1 Immediate transmission | Cat 2 LBT | Cat 4 LBT |
|---|---|---|
| When the gap from the end of the DL transmission to the beginning of the UL burst is not more than 16 μ sec. Note: Maximum limits of the duration of the UL burst other than those already derived from MCOT duration limits should be further discussed when specifications are developed. | For any of the following cases: When the gap between any two successive scheduled/granted transmissions in the COT is not greater than 25 μ sec For the case where a UL transmission in the gNB initiated COT is not followed by a DL transmission in the same COT Note: the duration from the start of the first transmission within the channel occupancy until the end of the last transmission in the same channel occupancy shall not exceed 20 ms. | N/A |

A UL burst is defined as a set of transmissions from a given UE having no gaps or gaps of no more than 16 μs. Transmissions from a UE having a gap of more than 16 μs are considered as separate UL bursts. The number of LBT attempts within a COT should be determined when specifications are developed.

It would be beneficial to allow a UE to transmit a Msg3 within a COT initiated by the gNB with a transmission of Msg2. In order to do this, several issues for the existing NR spec in NR Rel-15 must be addressed.

A first issue is how to signal the COT sharing indicator to a UE for its Msg3 transmission.

One option to signal the indicator would be via the RAR message, however, the existing RAR format does not contain any indicator on COT sharing for Msg3. A second issue is then how to update the existing RAR format to carry the COT sharing indicator for Msg3.

According to some embodiments, COT sharing for Msg3 is indicated to a UE in a RA procedure so that the UE may skip the ordinary Category 4 LBT for Msg3 transmissions within a shared COT period.

The COT sharing indicator may contain for example at least one of the following fields:
1) COT sharing indicator bit, indicating that Msg3 transmission can be launched within the current COT that is initiated by the gNB with a DL transmission (Msg2 or any other DL transmission intended to other UEs).
2) Channel access type, indicating a channel access type configured by the gNB for Msg3 transmission.
3) Channel access priority class, indicating a channel access priority class, which is associated with the configured channel access type (e.g., Category 4 LBT).

The COT sharing indicator for Msg3 may be signaled in a RAR message, either as one part of the UL grant field, or as new fields added to the RAR message.

With proposed mechanisms, unnecessary LBT operations for Msg3 may be avoided. Therefore, the UP latency for the new data is reduced. In addition, UE battery life may be saved by avoiding unnecessary LBT operations.

Some embodiments are described herein in the context of NR unlicensed spectrum (NR-U). However, the scope of the inventive concepts is not limited to NR-U scenarios. The inventive concepts are also applicable to other unlicensed operation scenarios, such as LTE LAA/eLAA/feLAA. In some embodiments, the COT sharing indicator for Msg3 may be indicated in an RAR message. The COT sharing indicator may contain for example at least one of the fields described above (i.e., a COT sharing indicator bit, a Channel access type, and/or a Channel access priority class.

There are several possible options to include the COT sharing indicators in the RAR message.

Option 1: the COT sharing indicators for Msg3 may be included in the UL grant field in the RAR message.

In one example, the 3GPP TS 38.213/Table 8.2-1 may be updated as below shown in Table 3 as an example. In this example, fields highlighted in the table are new fields. The size of UL grant may be increased from 27 bits to higher values in the range (between 28 bits to 33 bits depending on what fields are defined and what is the actual size for each new field).

TABLE 3

(3GPP TS 38.213/Table 8.2-1: updated Random Access Response Grant Content field size

| RAR grant field | Number of bits |
|---|---|
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |
| COT sharing indicator bit | 1 |
| Channel access type | 1 or 2 |
| Channel access priority class | 2 or 3 |

In another example, the COT sharing indicators may reuse some bits in any existing field in the UL grant field if they can be saved in some scenarios. In one case, it may be sufficient to use only 12 bits for PUSCH frequency resource allocation, as in LTE. Therefore, two bits can be reused to carry the COT sharing indicator. In another case, an MCS field or PUSCH frequency resource allocation field may be saved if an MCS or a PUSCH frequency resource allocation can be preconfigured to the UE for Msg3 transmission. In another case, if the associated RA is a contention based random access procedure, the CSI request field is not used, in this case, the CSI request field can be reused for carrying the COT sharing indicator purpose. In yet another case, the TPC command field is reused for carrying the COT sharing indicators, if a fixed TPC command value is preconfigured to the UE for transmission of the Msg3.

Option 2: the COT sharing indicators for Msg3 may be included in the RAR message as new fields. In one example, the RAR message size may be increased by 1 octet for the COT sharing indicators.

The R bits in the MAC payload of the RAR, and/or the R bits in the MAC subheader with Backoff Indicator can be reused for the COT sharing indicators. For the latter case, the COT sharing indicators are signaled to UEs that have transmit preambles, however, no RAR messages have been received by them. In this case, the UEs would apply the received COT sharing indicators for subsequent Msg3 transmissions within a detected COT.

In another example, the COT sharing indicators may reuse other field in the RAR message. In one case, the timing advance command field may be reused for the COT sharing indicators, if the UE is already in UL alignment, or the UE is located in a small cell which does not strictly require UEs in the cell to be UL aligned for UL transmissions, or the UE stays still, so that its uplink timing alignment remains the same.

In a further embodiment, the COT sharing indicators for Msg3 may be carried by other signaling means, such as a downlink control information (DCI), a MAC control element (CE), or an RRC signaling message. In one example, the COT sharing indicators may be carried in the COT information in the GC-PDCCH signaling. In this example, the UE performs a transmission for Msg3 according to a specified channel access type and/or a specified channel access priority class, within the detected COT period. In this example, the UE may first send a preamble. After that, the UE may detect a DL signal indicating a coming COT period within the RAR window. Accordingly, the UE may be required to monitor several PDCCHs (in different search spaces and/or in different CORESETs) at the same time.

In a further embodiment, the COT sharing for Msg3 with DL transmissions may be configured per UE/RA event/service/channel access priority class. A UE capability may be defined accordingly.

Figure 1:
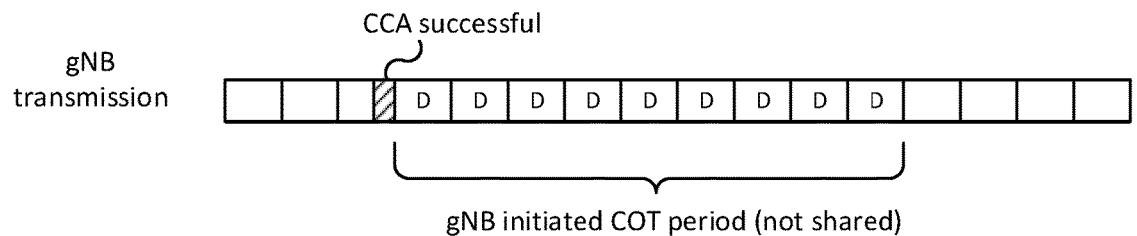
FIG. 1 illustrates transmission opportunities (TXOP) both with and without COT sharing where CCA is performed by the initiating node (gNB).
Figure 1:
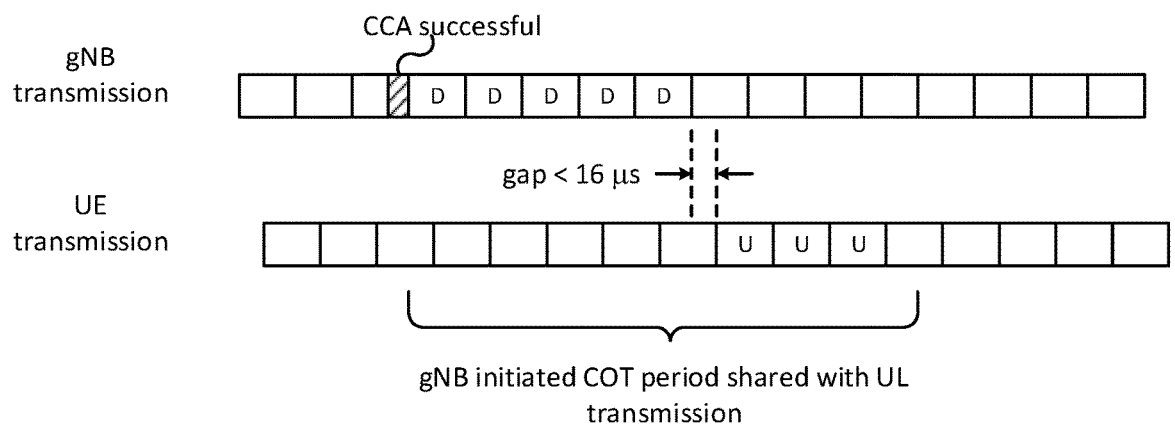
Figure 2:
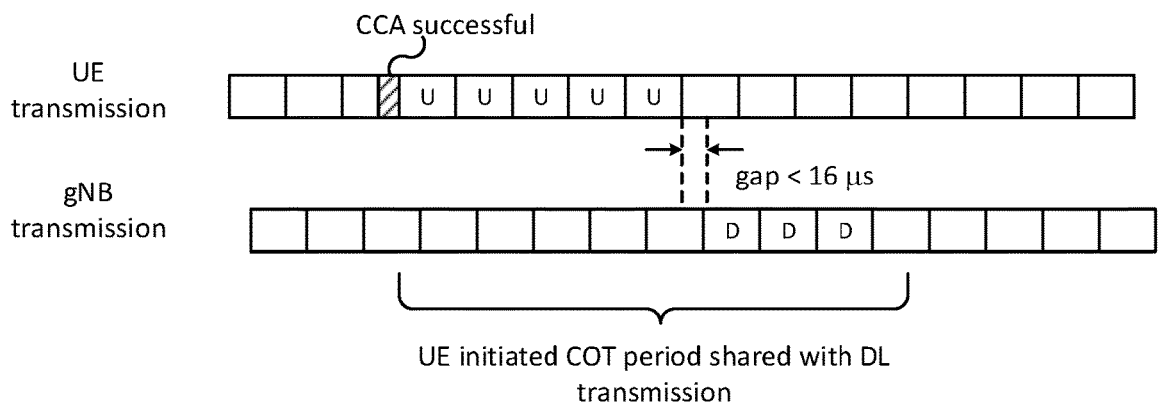
FIG. 2 illustrates an example on a UE COT sharing with the DL transmission.
Figure 3:
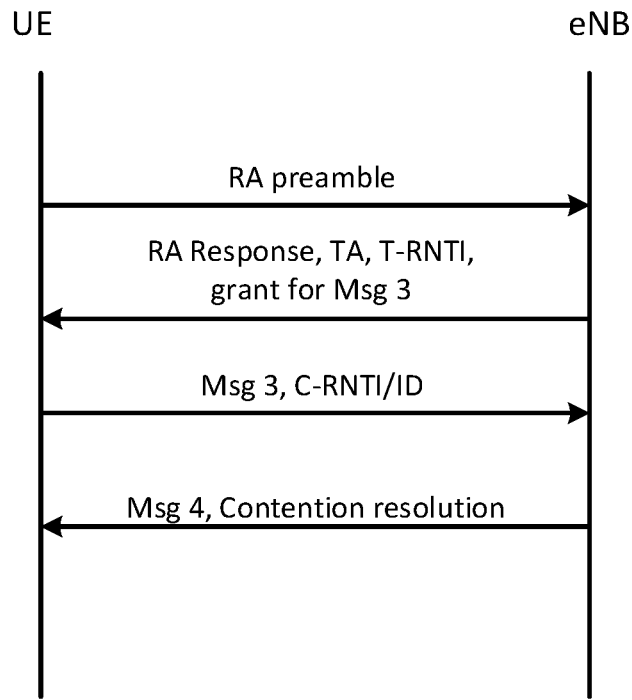
FIG. 3 illustrates a four-step random access procedure.
Figure 4:
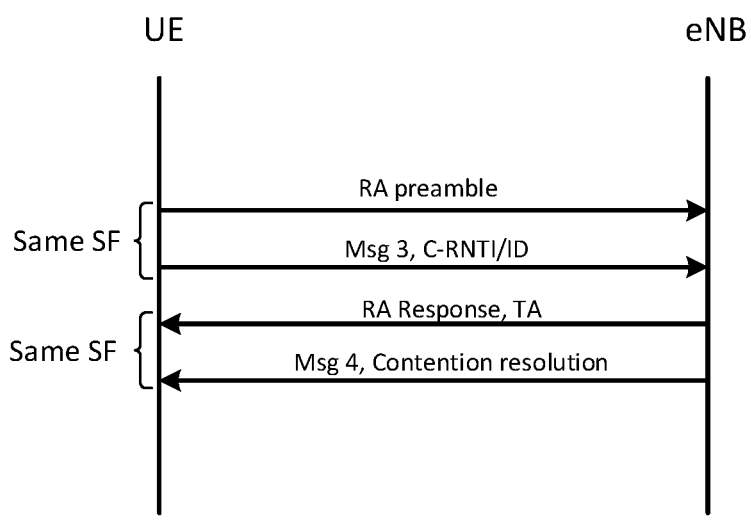
FIG. 4 illustrates a two-step random access procedure.
Figure 5:
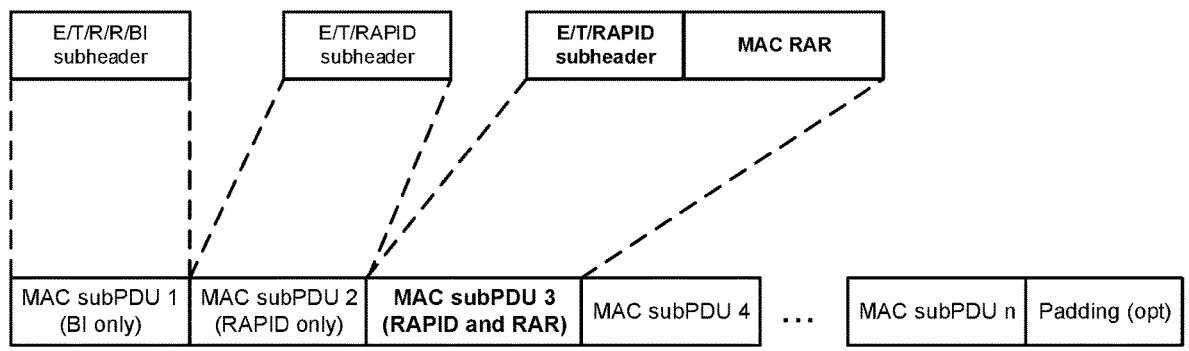
FIG. 5 illustrates a concatenated MAC PDU.
Figure 6:
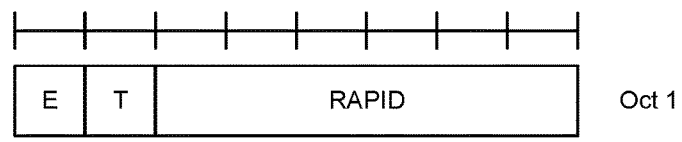
FIG. 6 illustrates a subheader corresponding to a RAR consisting of three header fields E/T/RAPID.
Figure 7:
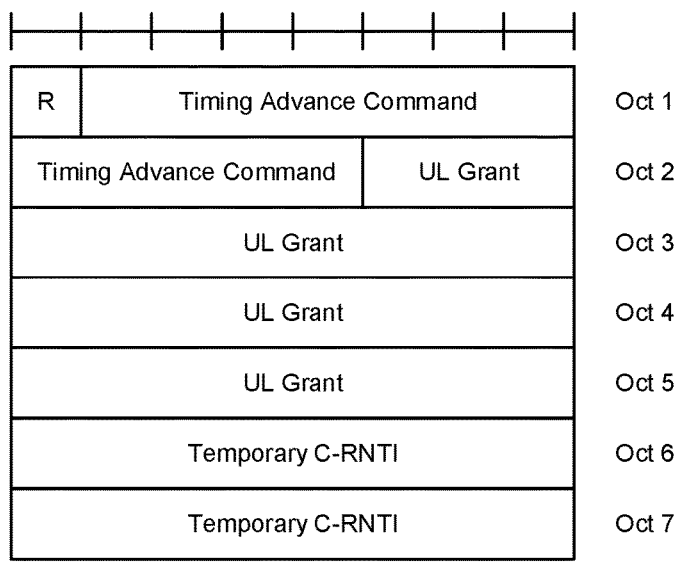
FIG. 7 illustrates a format for Timing Advance Command, UL Grant and Temporary C-RNTI messages.
Figure 8:
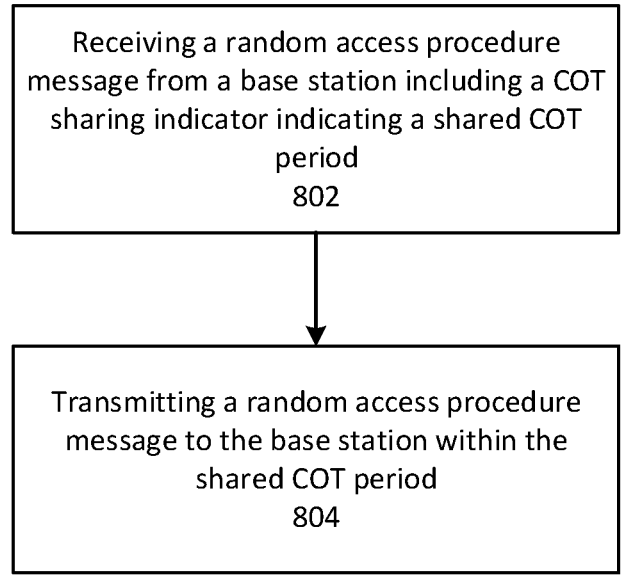
FIG. 8 is a flowchart that illustrates operations of a user equipment node according to some embodiments.

FIG. 8 illustrates operations of a UE according to some embodiments. As shown therein, a method of operating a UE in a wireless communication system includes receiving (802) a first random access procedure message from a base station, the first random access procedure message containing a channel occupancy time, COT, sharing indicator that indicates a shared COT period associated with the first random access procedure message, and transmitting (804) a second random access procedure message to the base station within the shared COT period.

Figure 9:
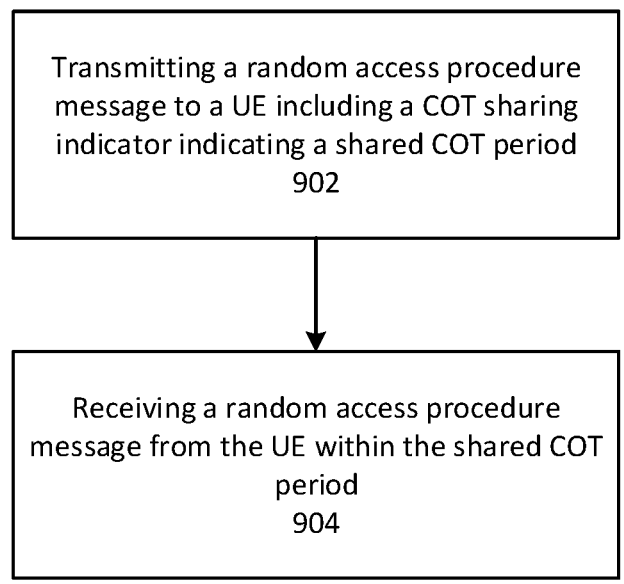
FIG. 9 is a flowchart that illustrates operations of a base station according to some embodiments.

FIG. 9 illustrates operations of a base station according to some embodiments. As shown therein, a method of operating a base station in a wireless communication system includes transmitting (902) a first random access procedure message to a user equipment, UE, the first random access procedure message containing a channel occupancy time, COT, sharing indicator that indicates a shared COT period associated with the first random access procedure message, and receiving (904) a second random access procedure message from the UE within the shared COT period.

Figure 10:
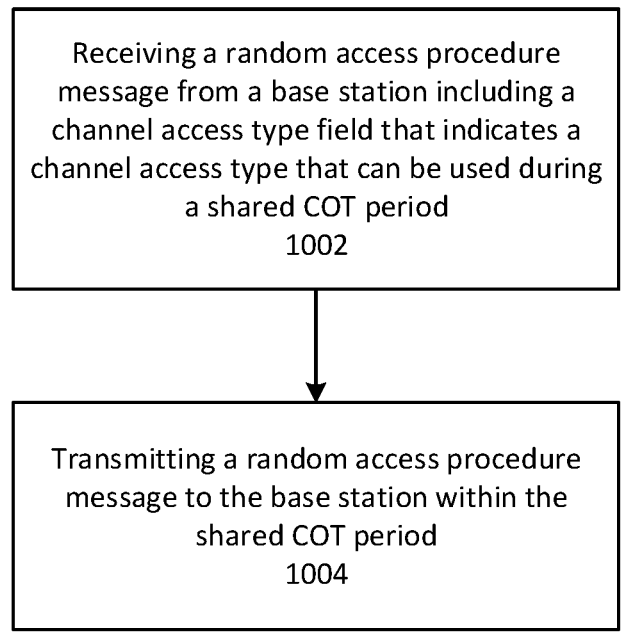
FIG. 10 is a flowchart that illustrates operations of a user equipment node according to further embodiments.

FIG. 10 illustrates operations of a UE according to further embodiments. As shown therein, a method of operating a UE in a wireless communication system includes receiving (1002) a first random access procedure message from a base station, the first random access procedure message containing a channel access type field that indicates a channel access type that can be used during a shared channel occupancy time (COT) period, and transmitting (1004) a second random access procedure message to the base station within the shared COT period.

Figure 11:
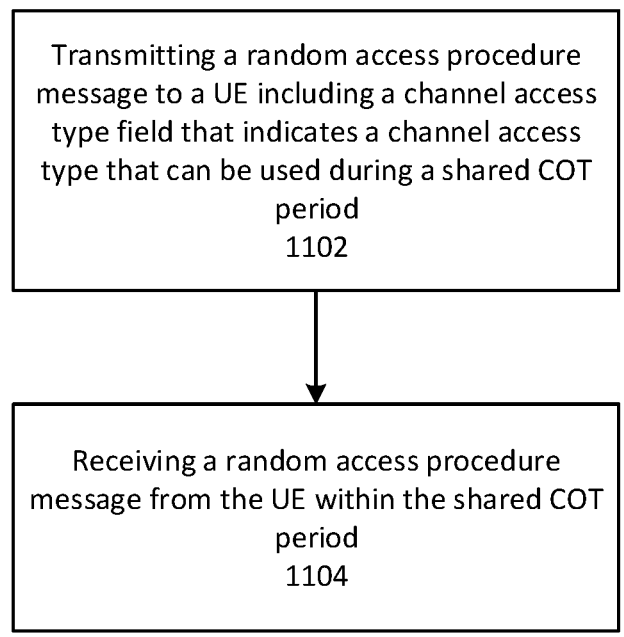
FIG. 11 is a flowchart that illustrates operations of a base station according to further embodiments.

FIG. 11 illustrates operations of a base station according to some embodiments. As shown therein, a method of operating a base station in a wireless communication system includes transmitting (1102) a first random access procedure message to a user equipment, UE, the first random access procedure message containing a channel access type field that indicates a channel access type that can be used during a shared channel occupancy time (COT) period, and receiving (1104) a second random access procedure message from the UE within the shared COT period.

In some embodiments, the second random access procedure message includes a Msg3 transmission, and the first random access procedure message includes a random access response message.

In some embodiments, the COT sharing indicator is included as part of an uplink grant field in the random access response message.

In some embodiments, the COT sharing indicator includes a COT sharing indicator bit indicating that the second random access procedure message can be transmitted within a current COT period.

In some embodiments, the COT sharing indicator includes a channel access type field that indicates a channel access type that can be used for transmitting the second random access procedure message.

In some embodiments, the COT sharing indicator includes a channel access priority class field that indicates a channel access priority class associated with a channel access type that can be used for transmitting the second random access procedure message.

In some embodiments, the COT sharing indicator includes a bit that is reused from an existing uplink grant field. In some embodiments, the existing uplink grant field includes an MCS field, a channel state information, CSI, request field or a physical uplink shared channel, PUSCH, frequency resource allocation field. In some embodiments, the COT sharing indicator includes two bits in a physical uplink shared channel, PUSCH, uplink grant field.

In some embodiments, the COT sharing indicator includes a new field in an uplink grant message.

In some embodiments, the COT sharing indicator includes a bit that is reused from a medium access control, MAC, payload or a MAC subheader.

In some embodiments, the COT sharing indicator includes a bit that is reused from a timing advance command field.

In some embodiments, the COT sharing indicator is transmitted in downlink control information, DCI, in a MAC control element, CE, or a radio resource control, RRC, signaling message.

The COT sharing may be configured per UE, RA event, service, and/or channel access priority class.

Accordingly, some embodiments described herein provide for Msg3 transmission in a gNB-initiated COT period. Compared to prior approaches, some embodiments can reduce/minimize the LBT impact on Msg3 and limit the potential changes to the spec.

In particular, compared to the other alternatives, such as providing to a UE with multiple grants in a RAR message, it is beneficial to reduce/minimize the LBT impact for Msg3 and limit the potential specification changes by allowing the UE to transmit Msg3 within a DL COT initiated by the gNB with a Msg2 transmission. In this case, the UE may avoid the ordinary Category 4 LBT for the Msg3 transmission if the switch gap between DL and UL is sufficiently short. In this way, it may be beneficial to reduce latency for Msg3 due to avoidance of ordinary LBT operations. The gNB is responsible for scheduling DL assignments and UL grants to UEs. Therefore, the gNB can control the gap between the end of the DL transmission to the beginning of the Msg3 transmission to be sufficiently short.

The gNB may also schedule other transmissions to other UEs to occupy the channel if there is a risk that the gap between the end of DL transmission and the start of the Msg3 transmission is not sufficiently short for the intended UE. Similar to the COT sharing scenario for a UL burst, if the gap is equal or shorter than 16 microseconds, the UE can apply an immediate transmission for Msg3 skipping LBT operations. If the gap is not greater than 25 microseconds, the UE can apply a Cat2 LBT for a Msg3 transmission. In other cases, the UE can perform a Category 4 LBT for the transmission of a Msg3.

To enhance transmission opportunities for Msg3, a UE is configured to transmit a Msg3 within a COT initiated by the gNB with a transmission of Msg2.

The detailed channel access mechanism for Msg3 can be signalled in the RAR message. In the LTE LAA, for dynamic scheduling, channel access type and channel access priority class are signaled via uplink grant in DCI (e.g., format 0A and format 0B), where channel access type occupies 1 bit, and CAPC occupies 2 bits. Channel access type and channel access priority class are signaled via uplink grant in DCI in LTE LAA.

It would be beneficial to apply the similar signaling mechanism for the Msg3 transmission in NR-U. Both channel access type and CAPC for transmission of Msg3 can be carried via uplink grant in the RAR message.

The channel access mechanism (channel access type and/or CAPC) for Msg3 may be signaled via uplink grant in the RAR message.

FURTHER DEFINITIONS AND EMBODIMENTS

With reference to FIG. 12, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 12 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 13. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 13) served by the base station 3320. The communication interface 3326 may be configured to facilitate a connection 3360 to the host computer 3310. The connection 3360 may be direct or it may pass through a core network (not shown in FIG. 13) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

It is noted that the host computer 3310, base station 3320 and UE 3330 illustrated in FIG. 13 may be identical to the host computer 3230, one of the base stations 3212a, 3212b, 3212c and one of the UEs 3291, 3292 of FIG. 12, respectively. This is to say, the inner workings of these entities may be as shown in FIG. 33 and independently, the surrounding network topology may be that of FIG. 32.

In FIG. 13, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, and/or power consumption and thereby provide benefits such as reduced user waiting time, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 14, 15:
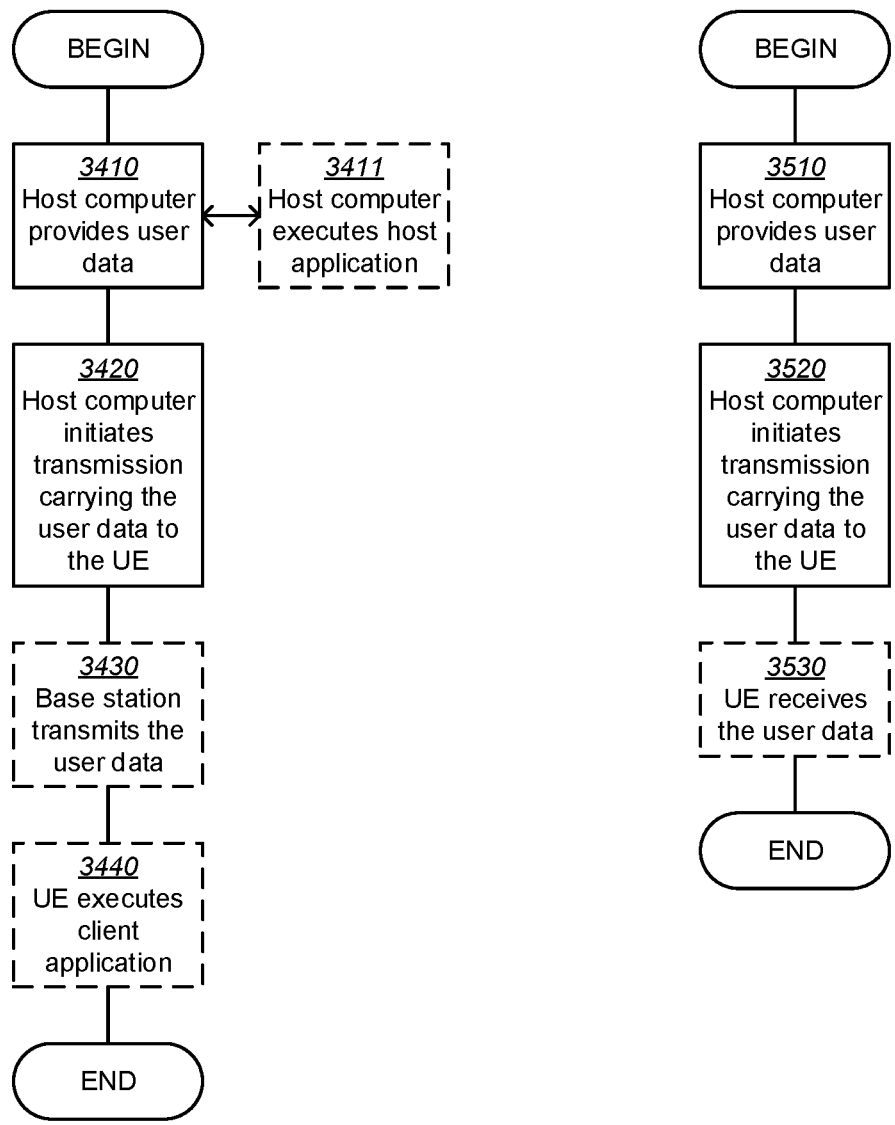

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 15 is a flowchart illustrating a method implemented in a communication system, in accordance with one embodiment. The communication system includes a host computer, a base station and a UE which may be those described with reference to FIGS. 32 and 33. For simplicity of the present disclosure, only drawing references to FIG. 15 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 16, 17:
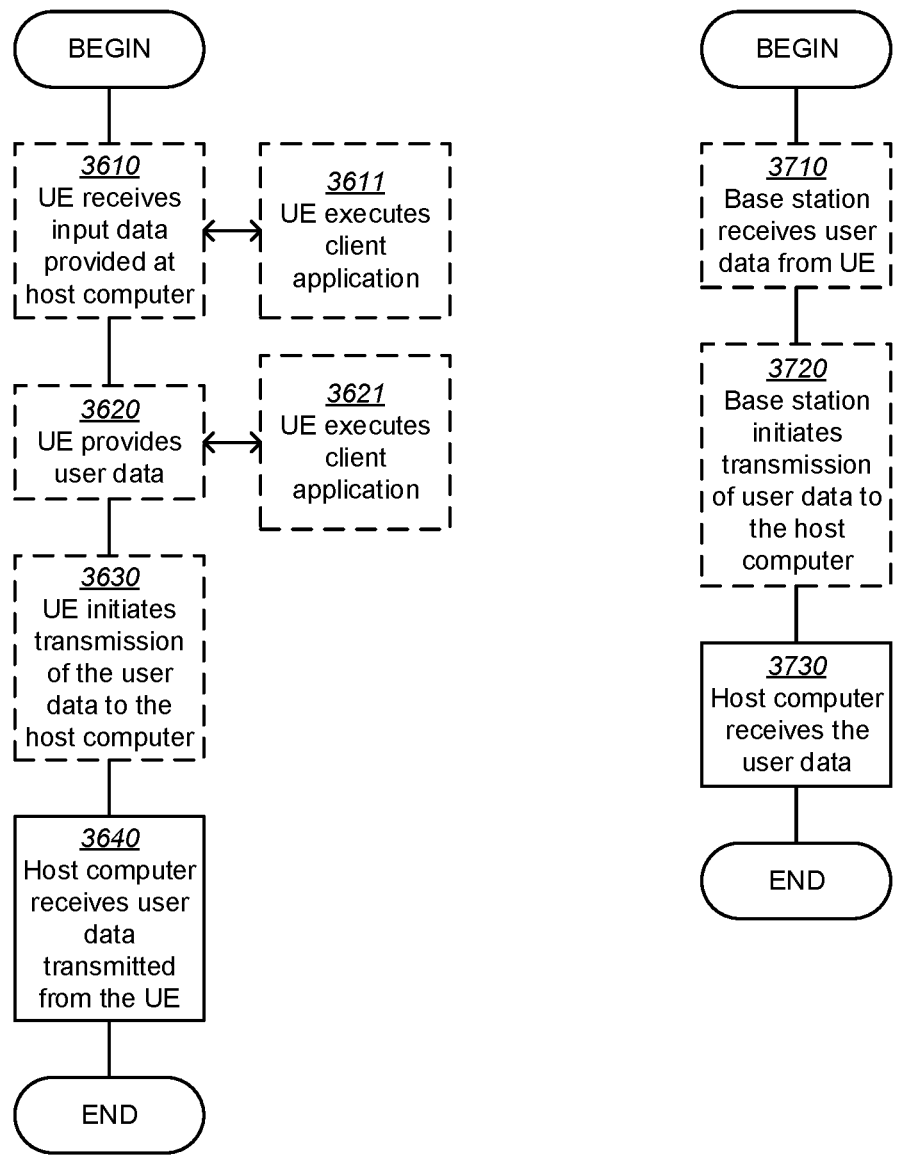

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

REFERENCES

[1] 3GPP TR 38.889 "Study on NR-based access to unlicensed spectrum, Release 16", v 16.0.0
[2] 3GPP TS 38.321, V15.4.0.
[3] 3GPP TS 38.213, V15.4.0.

EMBODIMENTS

Embodiment 1. A method of operating a user equipment, UE, in a wireless communication system, the method comprising:
    receiving a first random access procedure message from a base station, the first random access procedure message containing a channel occupancy time, COT, sharing indicator that indicates a shared COT period associated with the first random access procedure message; and
    transmitting a second random access procedure message to the base station within the shared COT period.

Embodiment 2. The method of any preceding embodiment, wherein the second random access procedure message comprises a Msg3 transmission.

Embodiment 3. The method of any preceding embodiment, wherein the first random access procedure message comprises a random access response message.

Embodiment 4. The method of embodiment 3, wherein the COT sharing indicator is included as part of an uplink grant field in the random access response message.

Embodiment 5. The method of any preceding embodiment, wherein the COT sharing indicator comprises a COT sharing indicator bit indicating that the second random access procedure message can be transmitted within a current COT period.

Embodiment 6. The method of any preceding embodiment, wherein the COT sharing indicator comprises a channel access type field that indicates a channel access type that can be used for transmitting the second random access procedure message.

Embodiment 7. The method of any preceding embodiment, wherein the COT sharing indicator comprises a channel access priority class field that indicates a channel access priority class associated with a channel access type that can be used for transmitting the second random access procedure message.

Embodiment 8. The method of embodiment 4, wherein the COT sharing indicator comprises a bit that is reused from an existing uplink grant field.

Embodiment 9. The method of embodiment 8, wherein the existing uplink grant field comprises an MCS field, a channel state information, CSI, request field or a physical uplink shared channel, PUSCH, frequency resource allocation field.

Embodiment 10. The method of embodiment 4, wherein the COT sharing indicator comprises a new field in an uplink grant message.

Embodiment 11. The method of embodiment 4, wherein the COT sharing indicator comprises a bit that is reused from a medium access control, MAC, payload or a MAC subheader.

Embodiment 12. The method of embodiment 4, wherein the COT sharing indicator comprises a bit that is reused from a timing advance command field.

Embodiment 13. The method of embodiment 1, wherein the COT sharing indicator is transmitted in downlink control information, DCI, in a MAC control element, CE, or a radio resource control, RRC, signaling message.

Embodiment 14. The method of any previous embodiment, wherein COT sharing is configured per UE, RA event, service, and/or channel access priority class.

Embodiment 15. A user equipment (UE) configured to communicate with a base station, the UE comprising a radio interface and processing circuitry configured to perform operations according to any of embodiments 1 to 14.

Embodiment 16. A method implemented in a base station, comprising transmitting a first random access procedure message to a user equipment, UE, the first random access procedure message containing a channel occupancy time, COT, sharing indicator that indicates a shared COT period associated with the first random access procedure message; and receiving a second random access procedure message from the UE within the shared COT period.

Embodiment 17. The method of embodiment 16, wherein the second random access procedure message comprises a Msg3 transmission.

Embodiment 18. The method of embodiment 16 or 17, wherein the first random access procedure message comprises a random access response message.

Embodiment 19. The method of any of embodiments 16 to 18, wherein the COT sharing indicator is included as part of an uplink grant field in the random access response message.

Embodiment 20. The method of any of embodiments 16 to 19, wherein the COT sharing indicator comprises a COT sharing indicator bit indicating that the second random access procedure message can be transmitted within a current COT period.

Embodiment 21. The method of any of embodiments 16 to 20, wherein the COT sharing indicator comprises a channel access type field that indicates a channel access type that can be used for transmitting the second random access procedure message.

Embodiment 22. The method of any of embodiments 16 to 21, wherein the COT sharing indicator comprises a channel access priority class field that indicates a channel access priority class associated with a channel access type that can be used for transmitting the second random access procedure message.

Embodiment 23. The method of embodiment 19, wherein the COT sharing indicator comprises a bit that is reused from an existing uplink grant field.

Embodiment 24. The method of embodiment 23, wherein the existing uplink grant field comprises an MCS field, a channel state information, CSI, request field or a physical uplink shared channel, PUSCH, frequency resource allocation field.

Embodiment 25. The method of embodiment 19, wherein the COT sharing indicator comprises a new field in an uplink grant message.

Embodiment 26. The method of embodiment 19, wherein the COT sharing indicator comprises a bit that is reused from a medium access control, MAC, payload or a MAC subheader.

Embodiment 27. The method of embodiment 19, wherein the COT sharing indicator comprises a bit that is reused from a timing advance command field.

Embodiment 28. The method of embodiment 16, wherein the COT sharing indicator is transmitted in downlink control information, DCI, in a MAC control element, CE, or a radio resource control, RRC, signaling message.

Embodiment 29. The method of any of embodiments 16 to 28, wherein COT sharing is configured per UE, RA event, service, and/or channel access priority class.

Embodiment 30. A base station configured to communicate with a user equipment (UE), the base station comprising a radio interface and processing circuitry configured to perform operations according to any of embodiments 16 to 29.

Explanation of Abbreviations

| | |
|---|---|
| 3GPP | Third Generation Partnership Project |
| BI | Backoff Indicator |
| CCA | Clear Channel Assessment |
| COT | Channel Occupancy Time |
| CSI-RS | Channel State Information-Reference Signal |
| CWS | Contention Window Size |
| DC | Dual Connectivity |
| DCI | Downlink Control Information |
| DL | Downlink |
| DRS | Discovery Reference Signal |
| ED | Energy Detection |
| gNB | gNodeB |
| LAA | License Assisted Access |
| LBT | Listen Before Talk |
| LTE | Long Term Evolution |
| MAC | Medium Access Control |
| MCOT | Maximum Channel Occupancy Time |
| MCS | Modulation and Coding Scheme |
| NR | New Radio |
| PBCH | Physical Broadcast Channel |
| PDCCH | Physical Downlink Control Channel |
| PDSCH | Physical Downlink Shared Channel |
| PDU | Protocol Data Unit |
| PRACH | Physical Random Access Channel |
| PSS | Primary Synchronization Signal |
| PUCCH | Physical Uplink Control Channel |
| PUSCH | Physical Uplink Shared Channel |
| QoS | Quality of Service |
| RA | Random Access |
| RACH | Random Access Channel |
| RAR | Random Access Response |
| RAT | Radio Access Technology |
| RRC | Radio Resource Control |
| RRM | Radio Resource Management |
| RSRP | Reference Signal Received Power |
| RSRQ | Reference Signal Received Quality |
| RSSI | Received Signal Strength Indicator |
| SI | System Information |
| SR | Scheduling Request |
| SSB | Synchronization Signal Block |
| SSS | Secondary Synchronization Signal |
| TA | Timing Alignment |
| TPC | Transmit Power Control |
| UCI | Uplink Control Information |
| UE | User Equipment |
| UL | Uplink |

The invention claimed is:

1. A method of operating a user equipment, UE, in a wireless communication system, the method comprising:
receiving a first random access procedure message from a base station, the first random access procedure message containing a channel access type field that indicates a channel access type used for transmitting the second random access procedure message during a shared channel occupancy time, COT, period associated with the first random access procedure message; and
transmitting a second random access procedure message to the base station within the shared COT period;
wherein the first random access procedure message further comprises a COT sharing indicator that indicates the shared COT period associated with the first random access procedure message, wherein the COT sharing indicator comprises one of:
  a bit that is reused from an existing uplink grant field,
  a bit that is reused from a medium access control, MAC, payload or a MAC subheader, or
  a bit that is reused from a timing advance command field.

2. The method of claim 1, wherein the COT sharing indicator comprises a COT sharing indicator bit indicating that the second random access procedure message can be transmitted within a current COT period.

3. The method of claim 1, wherein the COT sharing indicator comprises a channel access priority class field that indicates a channel access priority class associated with a channel access type that can be used for transmitting the second random access procedure message.

4. The method of claim 1, wherein the existing uplink grant field comprises an MCS field, a channel state information, CSI, request field or a physical uplink shared channel, PUSCH, frequency resource allocation field.

5. The method of claim 1, wherein the COT sharing indicator comprises a new field in an uplink grant message.

6. The method of claim 1, wherein the COT sharing indicator is transmitted in downlink control information, DCI, in a MAC control element, CE, or a radio resource control, RRC, signaling message.

7. The method of claim 1, wherein the channel access type field comprises two bits out of a physical uplink shared channel, PUSCH, resource allocation in an uplink grant field.

8. A method of operating a base station, comprising
  transmitting a first random access procedure message to a user equipment, UE, the first random access procedure message containing a channel access type field that indicates a channel access type used for transmitting a second random access procedure message during a shared channel occupancy time, COT, period associated with the first random access procedure message; and
  receiving the second random access procedure message from the UE within the shared COT period;
  wherein the first random access procedure message comprises a channel occupancy time, COT, sharing indicator that indicates the shared COT period associated with the first random access procedure message, wherein the COT sharing indicator comprises:
    a bit that is reused from an existing uplink grant field,
    a bit that is reused from a medium access control, MAC, payload or a MAC subheader, or
    a bit that is reused from a timing advance command field.

9. The method of claim 8, wherein the COT sharing indicator comprises a COT sharing indicator bit indicating that the second random access procedure message can be transmitted within a current COT period.

10. The method of claim 8, wherein the COT sharing indicator comprises a channel access priority class field that indicates a channel access priority class associated with a channel access type that can be used for transmitting the second random access procedure message.

11. The method of claim 8, wherein the existing uplink grant field comprises an MCS field, a channel state information, CSI, request field or a physical uplink shared channel, PUSCH, frequency resource allocation field.

12. The method of claim 8, wherein the COT sharing indicator comprises a new field in an uplink grant message.

13. The method of claim 8, wherein the COT sharing indicator is transmitted in downlink control information, DCI, in a MAC control element, CE, or a radio resource control, RRC, signaling message.

14. The method of claim 8, wherein the channel access type field comprises two bits out of a physical uplink shared channel, PUSCH, resource allocation in an uplink grant field.

* * * * *